US012658172B2

(12) United States Patent
Mukherjee et al.

(10) Patent No.: US 12,658,172 B2
(45) Date of Patent: Jun. 16, 2026

(54) COMPUTING SYSTEM FOR UNSUPERVISED EMOTIONAL TEXT TO SPEECH TRAINING

(71) Applicant: Microsoft Technology Licensing, LLC, Redmond, WA (US)

(72) Inventors: Arijit Mukherjee, Uttarpara (IN); Shubham Bansal, Yamunanagar (IN); Sandeepkumar Satpal, Hyderabad (IN); Rupeshkumar Rasiklal Mehta, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/677,976

(22) Filed: Feb. 22, 2022

(65) Prior Publication Data

US 2023/0111824 A1 Apr. 13, 2023

Related U.S. Application Data

(60) Provisional application No. 63/250,981, filed on Sep. 30, 2021.

(51) Int. Cl.
| | |
|---|---|
| *G10L 13/02* | (2013.01) |
| *G06N 3/088* | (2023.01) |
| *G10L 13/00* | (2006.01) |
| *G10L 13/10* | (2013.01) |
| *G10L 25/30* | (2013.01) |
| *G10L 25/63* | (2013.01) |

(52) U.S. Cl.
CPC ............. *G10L 13/02* (2013.01); *G06N 3/088* (2013.01); *G10L 13/00* (2013.01); *G10L 13/10*
(2013.01); *G10L 25/30* (2013.01); *G10L 25/63* (2013.01); *G10L 2013/105* (2013.01)

(58) Field of Classification Search
CPC ......... G10L 13/02; G10L 13/00; G10L 13/10; G10L 25/30; G10L 25/63; G10L 2013/105; G10L 13/033; G06N 3/088; G06F 40/30
See application file for complete search history.

(56) References Cited

U.S. PATENT DOCUMENTS

| | | | |
|---|---|---|---|
| 11,194,972 B1 | 12/2021 | Tao et al. | |
| 11,418,461 B1 | 8/2022 | Elfardy et al. | |

(Continued)

OTHER PUBLICATIONS

"Final Office Action Issued In U.S. Appl. No. 17/524,288", Mailed Date: Aug. 9, 2023, 64 Pages.

(Continued)

*Primary Examiner* — Michael N Opsasnick
(74) *Attorney, Agent, or Firm* — Shook, Hardy & Bacon L.L.P.

(57) ABSTRACT

A text to speech (TTS) model is trained based on training data including text samples. The text samples are provided to a text embedding model for outputting text embeddings for the text samples. The text embeddings are clustered into several clusters of text embeddings. The several clusters are representative of variations in emotion. The TTS model is then trained based upon the several clusters of text embeddings. Upon being trained, the TTS model is configured to receive text input and output a spoken utterance that corresponds to the text input. The TTS model is configured to output the spoken utterance with emotion. The emotion is based upon the text input and the training of the TTS model.

20 Claims, 8 Drawing Sheets

(56) References Cited

U.S. PATENT DOCUMENTS

| | | | |
|---|---|---|---|
| 11,854,538 B1 | 12/2023 | Rozgic | |
| 2013/0018837 A1 | 1/2013 | Lee | |
| 2015/0058019 A1* | 2/2015 | Chen | G10L 13/08 |
| | | | 704/260 |
| 2015/0058109 A1* | 2/2015 | Lange | G06Q 30/0224 |
| | | | 705/14.25 |
| 2018/0174020 A1* | 6/2018 | Wu | G06N 3/08 |
| 2020/0074981 A1* | 3/2020 | Chae | G10L 25/63 |
| 2020/0372897 A1* | 11/2020 | Battenberg | G10L 13/033 |
| 2021/0287657 A1 | 9/2021 | Deng et al. | |
| 2021/0350795 A1 | 11/2021 | Kenter et al. | |
| 2022/0051654 A1 | 2/2022 | Finkelstein et al. | |
| 2022/0129621 A1 | 4/2022 | Guda et al. | |
| 2022/0301543 A1 | 9/2022 | Elias et al. | |
| 2023/0099732 A1* | 3/2023 | Mukherjee | G10L 25/30 |
| | | | 704/258 |

OTHER PUBLICATIONS

Lei, et al., "Fine-Grained Emotion Strength Transfer, Control and Prediction for Emotional Speech Synthesis", In Proceedings of the IEEE Spoken Language Technology Workshop (SLT), Jan. 19, 2021, pp. 423-430.

Li, et al., "Controllable Emotion Transfer For End-To-End Speech Synthesis", In Proceedings of the 12th international Symposium on Chinese Spoken Language Processing, Jan. 24, 2021, 5 Pages.

Schnell, et al., "Emocat: Language-Agnostic Emotional Voice Conversion", In Repository of arXiv:2101.05695v1, Jan. 14, 2021, 5 Pages.

Tits, Noe, "A Methodology for Controlling the Emotional Expressiveness in Synthetic Speech—a Deep Learning Approach", In Proceedings of the 8th International Conference on Affective Computing and Intelligent Interaction Workshops and Demos (ACIIW), Sep. 3, 2019, pp. 6-10.

Cai, et al., "Emotion controllable speech synthesis using emotion-unlabeled dataset with the assistance of cross-domain speech emotion recognition", arXiv:2010.13350v1, 2020, 5 pages.

Non-Final Office Action mailed on May 15, 2024, in U.S. Appl. No. 17/524,288 61 pages.

Notice of Allowance mailed on Jan. 8, 2025, in U.S. Appl. No. 17/524,288 12 pages.

Um, Se-Yun, et al., "Emotional Speech Synthesis with Rich and Granularized Control," ICASSP 2020-2020 IEEE International Conference on Acoustics, Speech and Signal Processing (ICASSP). IEEE, 2020, pp. 7254-7258.

Zhu, et al., "Control Emotion Intensity for LSTM-Based Expressive Speech Synthesis," International Conference of Pioneering Computer Scientists, Engineers and Educators, Singapore, Springer Singapore, 2019, pp. 645-656.

"Non Final Office Action Issued in U.S. Appl. No. 17/524,288", Mailed Date: Jan. 24, 2023, 43 Pages.

Gao, et al., "Interactive Text-to-Speech System via Joint Style Analysis", In Repository of: arXiv preprint arXiv:2002.06758v2, Sep. 21, 2020, pp. 1-5.

Huang, et al., "EmotionX-IDEA: Emotion BERT—an Affectional Model for Conversation", In Repository of arXiv:1908.06264v1, Aug. 17, 2019, 6 Pages.

Luo, et al., "EmotionX-HSU: Adopting Pre-trained BERT for Emotion Classification", In Repository of: arXiv preprint arXiv:1907.09669, Jul. 23, 2019, pp. 1-4.

Wang, et al., "Style Tokens: Unsupervised Style Modeling, Control and Transfer in End-to-End Speech Synthesis", In Repository of: arXiv preprint arXiv: 1803.09017, Jul. 3, 2018, pp. 1-10.

Wu, et al., "End-to-End Emotional Speech Synthesis using Style Tokens and Semi-Supervised Training", In Proceedings of ASIPA Annual Summit and Conference, Nov. 18, 2019, pp. 623-627.

Zhu, et al., "Controlling Emotion Strength with Relative Attribute for End-to-End Speech Synthesis", In Conference of IEEE Automatic Speech Recognition and Understanding Workshop, Dec. 14, 2019, pp. 192-199.

* cited by examiner

200

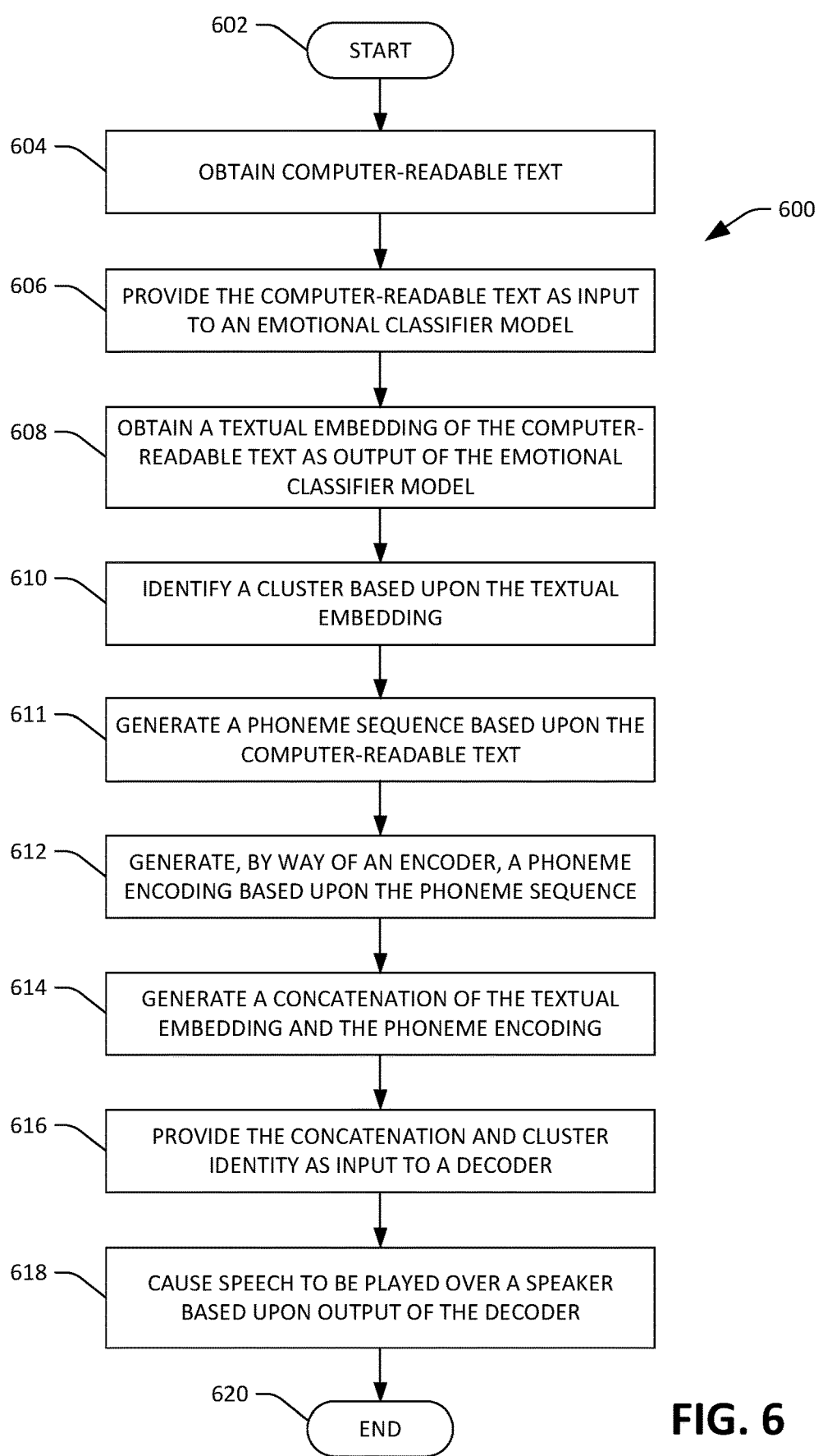

602 — START

604 — OBTAIN COMPUTER-READABLE TEXT

600

606 — PROVIDE THE COMPUTER-READABLE TEXT AS INPUT TO AN EMOTIONAL CLASSIFIER MODEL

608 — OBTAIN A TEXTUAL EMBEDDING OF THE COMPUTER-READABLE TEXT AS OUTPUT OF THE EMOTIONAL CLASSIFIER MODEL

610 — IDENTIFY A CLUSTER BASED UPON THE TEXTUAL EMBEDDING

611 — GENERATE A PHONEME SEQUENCE BASED UPON THE COMPUTER-READABLE TEXT

612 — GENERATE, BY WAY OF AN ENCODER, A PHONEME ENCODING BASED UPON THE PHONEME SEQUENCE

614 — GENERATE A CONCATENATION OF THE TEXTUAL EMBEDDING AND THE PHONEME ENCODING

616 — PROVIDE THE CONCATENATION AND CLUSTER IDENTITY AS INPUT TO A DECODER

618 — CAUSE SPEECH TO BE PLAYED OVER A SPEAKER BASED UPON OUTPUT OF THE DECODER

620 — END

FIG. 6

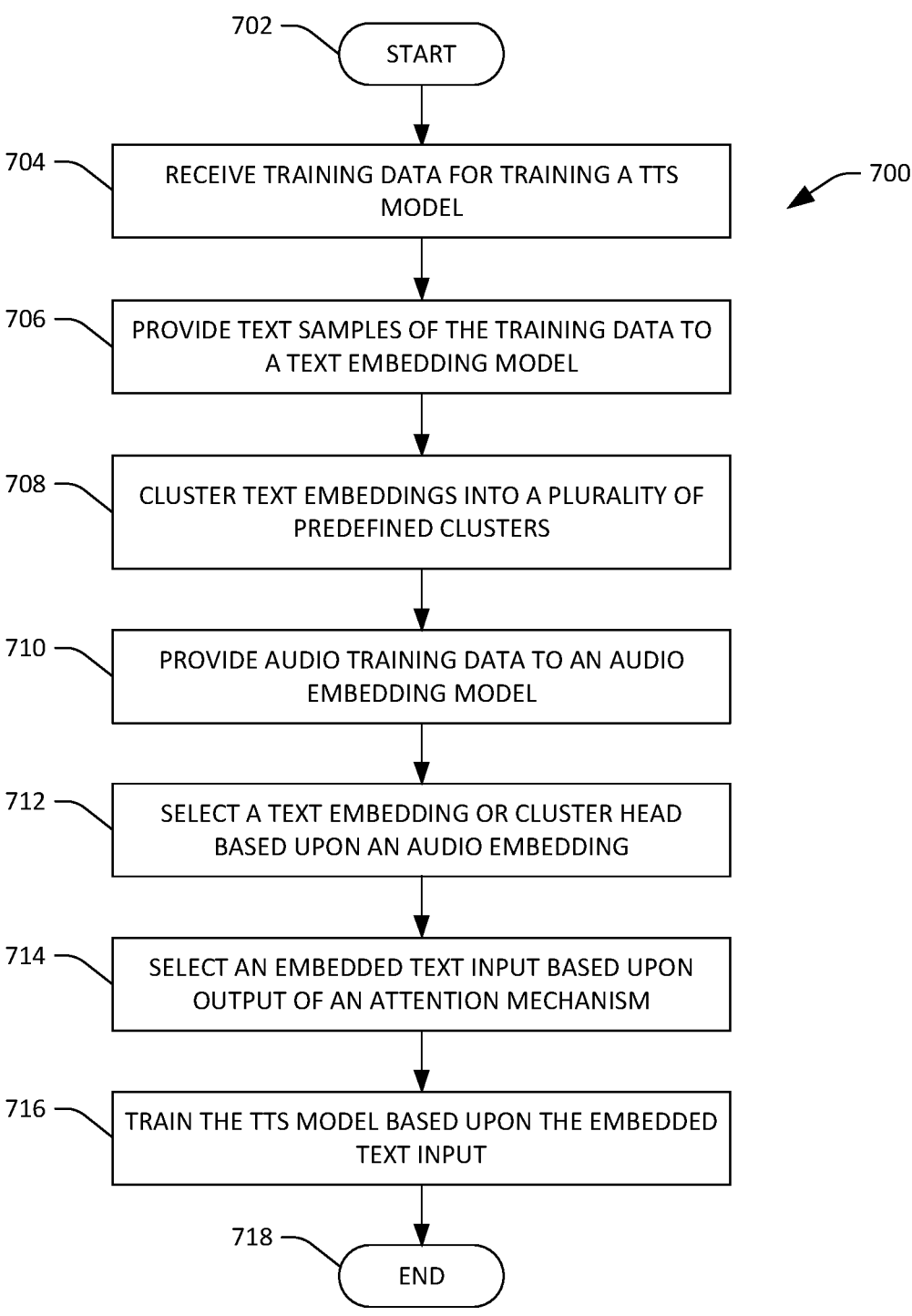

702 — START

704 — RECEIVE TRAINING DATA FOR TRAINING A TTS MODEL

700

706 — PROVIDE TEXT SAMPLES OF THE TRAINING DATA TO A TEXT EMBEDDING MODEL

708 — CLUSTER TEXT EMBEDDINGS INTO A PLURALITY OF PREDEFINED CLUSTERS

710 — PROVIDE AUDIO TRAINING DATA TO AN AUDIO EMBEDDING MODEL

712 — SELECT A TEXT EMBEDDING OR CLUSTER HEAD BASED UPON AN AUDIO EMBEDDING

714 — SELECT AN EMBEDDED TEXT INPUT BASED UPON OUTPUT OF AN ATTENTION MECHANISM

716 — TRAIN THE TTS MODEL BASED UPON THE EMBEDDED TEXT INPUT

718 — END

FIG. 7

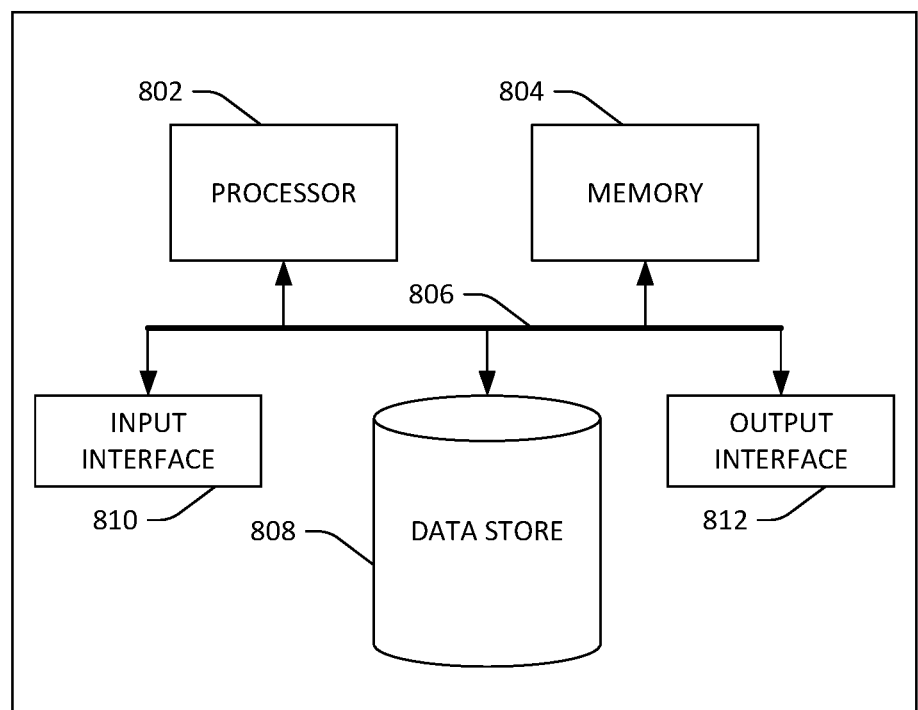
FIG. 8

COMPUTING SYSTEM FOR UNSUPERVISED EMOTIONAL TEXT TO SPEECH TRAINING

RELATED APPLICATION

This application claims priority to U.S. Provisional Patent Application No. 63/250,981, filed on Sep. 30, 2021, and entitled "COMPUTING SYSTEM FOR DOMAIN EXPRESSIVE TEXT TO SPEECH," the entirety of which is incorporated herein by reference.

BACKGROUND

A text to speech (TTS) computing system converts computer-readable text into speech that is played over a speaker. TTS computing systems have a wide variety of applications, such as in assistive technologies that aid the visually impaired, video games, and customer service interactions. Recent TTS computing systems have been developed that can generate expressive speech that captures underlying emotion in text. With more particularity, prosody features of the expressive speech match the emotion underlying the text. For instance, from a listener's perspective, it is desirable for a TTS computing system to deliver "happy" news using speech that is in a "happy" tone as opposed to a "neutral" tone or a "sad" tone. In an example, a conventional TTS computing system is provided with the text "I was on cloud nine when I found out I got my dream job!" and an emotional label assigned to the text that indicates that spoken utterances corresponding to the text are to be emitted with a "happy" emotion. The conventional TTS computing system, based upon the label and the text, generates speech with prosody features that reflect a "happy" emotion. The conventional TTS computing system causes the speech to be played over a speaker.

Conventional TTS computing systems suffer from various deficiencies. First, conventional TTS computing systems require a large amount of manually labeled data during model training; that is, conventional TTS computing systems require text (e.g., "I am sorry to hear about your loss, I hope you get well soon."), audio data corresponding to the text, and an emotional label (e.g., "sad") assigned to the text and the audio in order to train a model that synthesizes expressive speech from text. This is a cumbersome process that adds a large amount of time and complexity to the model training process. Second, conventional TTS computing systems require an emotional label at run-time (provided along with text that is to be converted to speech) in order to generate expressive speech. In an example, a conventional TTS computing system requires a user computing device operated by a user to provide the text and the emotional label to the conventional TTS computing system; if the emotional label is not present, then the TTS computing system emits audio in a "flat", unexpressive manner. Third, conventional TTS computing systems do not enable a user to specify a "level" of emotion that is to be expressed in expressive speech. In an example, a conventional TTS computing system is able to synthesize speech that expresses an "angry" emotion from text upon being provided with the text and an "angry" emotional label, but the conventional TTS computing system cannot control a degree in which the "anger" is expressed in the speech.

SUMMARY

The following is a brief summary of subject matter that is described in greater detail herein. This summary is not intended to be limiting as to the scope of the claims.

Various technologies pertaining to expressive text to speech (TTS) are described herein. The technologies described herein synthesize expressive speech from text without requiring emotional labels during TTS model training or at run-time. Furthermore, the technologies described herein also enable audible output of speech to be expressed with a "level" of an emotion (e.g., slightly angry, very angry, etc.). Thus, it is to be understood that the technologies described herein relate to employing unsupervised learning technologies in connection with training a TTS model, where there may be misalignment between emotions associated with text and emotion associated with corresponding speech (e.g., a text classifier indicates that text has a first emotion associated therewith, while an audio classifier indicates that corresponding audio has a second emotion associated therewith, where the first emotion and second emotion are different). The technologies described herein allow for more training data to be employed in connection with training the TTS model when compared to conventional approaches.

In an example embodiment, a computer-implemented method for training a TTS model is provided. The method includes receiving training data for training the TTS model. The training data includes text that includes text samples. The method also includes providing the text samples to a text embedding model. The text embedding model outputs text embeddings for the text samples. Additionally, the method includes clustering the text embeddings into several clusters of text embeddings. The several clusters are representative of variations in emotion. The TTS model is then trained based upon the several clusters of text embeddings. Upon being trained, the TTS model is configured to receive text input and output a spoken utterance that corresponds to the text input. The TTS model is also configured to output the spoken utterance with emotion. The emotion is based upon the text input and the training of the TTS model.

The above-described technologies present various advantages over conventional TTS computing systems. First, the above-described technologies do not require data that is labeled with emotional labels in order to train a TTS model. This reduces storage requirements and simplifies the training process of the TTS model. Additionally, the above-described technologies reduce time and computational costs associated with labeling. Second, at run-time, the above-described technologies do not require an emotional label to be provided along with text that is to be synthesized into speech, and thus the above-described technologies offer improved user experience. Furthermore, this results in computational advantages, as the technologies described above do not need to process an emotional label at run-time in order to synthesize the speech. Third, the above-described technologies enable a TTS system to audibly output speech with differing "levels" of emotion. Fourth, the above-described technologies enable expressive speech to be synthesized that includes prosody features that reflect a particular domain.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 6 is a flow diagram that illustrates an exemplary methodology performed by a computing system that performs expressive TTS.

FIG. 7 is a flow diagram that illustrates an exemplary methodology for training an expressive TTS model.

FIG. 8 depicts an exemplary computing device.

Figure 1:
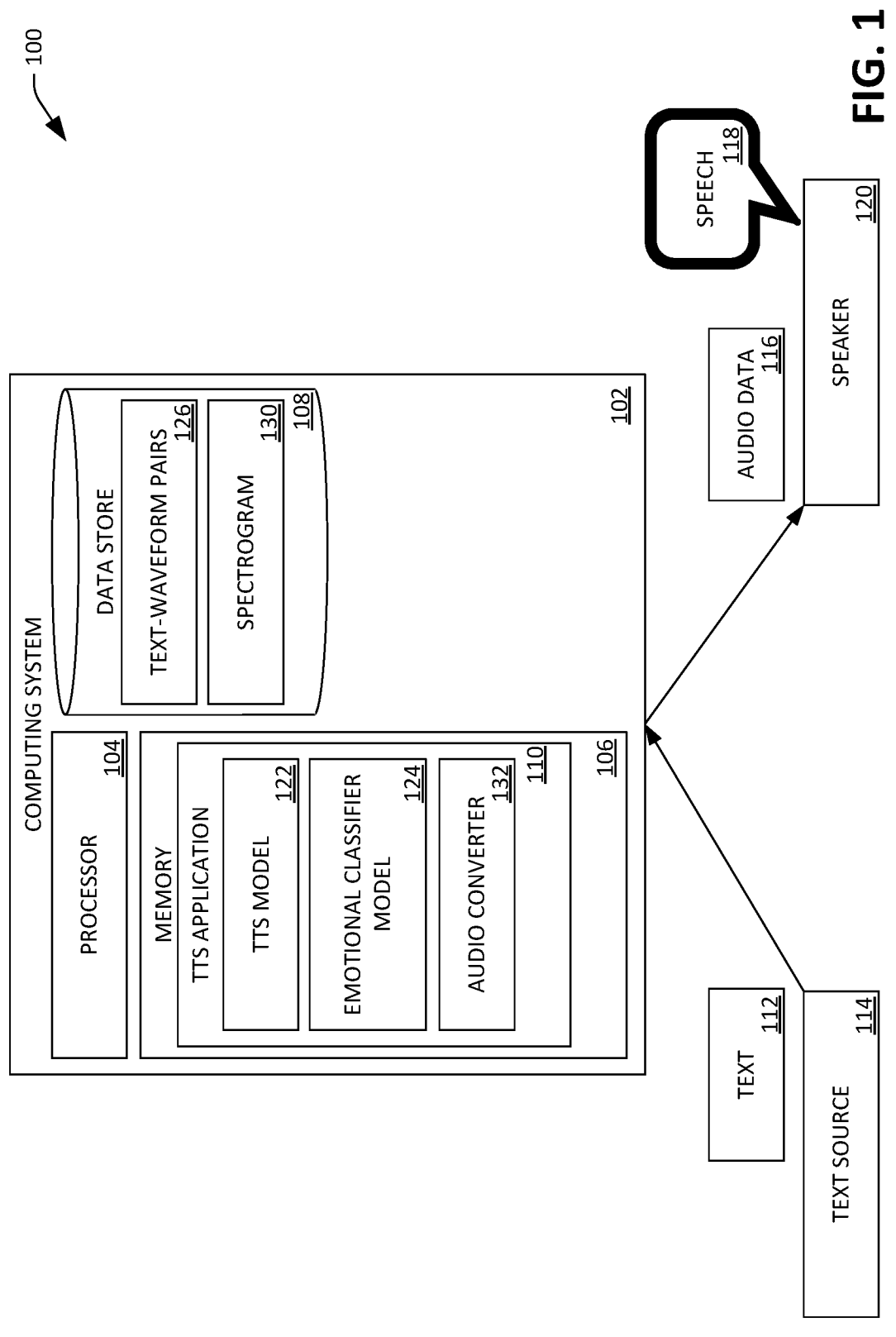
FIG. 1 is a functional block diagram of an exemplary computing environment that facilitates expressive text to speech (TTS).

Various technologies pertaining to expressive TTS are now described with reference to the drawings, wherein like reference numerals are used to refer to like elements throughout. The term "expressive", as used herein, refers to a TTS system audibly emitting spoken utterances with tone, volume, speed, etc. such that an appropriate emotion corresponding to text is relayed to a listener. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

DETAILED DESCRIPTION

As noted above, a conventional text to speech (TTS) computing system requires emotional labels both during model generation and at run-time in order for the TTS computing system to synthesize expressive speech. Conventional TTS computing systems are unable to emit emotion in degrees of emotion unless such degrees are predefined and pre-labeled. To address these issues, a computing system is described herein that is configured to obtain a textual embedding of computer-readable text, where an emotional classifier model generates the textual embedding based upon the text. The computing system also identifies a cluster from amongst several clusters based upon the textual embedding, where the clusters have been identified previously from a set of training data. In addition, the computing system obtains a phoneme encoding of the text from an encoder of a TTS model. The computing system synthesizes speech based upon the textual embedding, an identity of the cluster to which the textual embedding belongs, and the phoneme encoding, where prosody features of the speech reflect an emotion underlying the text. The computing system does not require data labeled with emotional labels during model training or at run-time.

In example operation, a computing system obtains computer-readable text from an electronic source, where the text includes words. It is contemplated that the words may be associated with an emotion. In an example, the words of the text are "I am sorry for your loss," and hence the associated emotion is "sad." The computing system provides the text as input to an emotional classifier model that has been trained to assign a label that identifies an emotion to input text; that is, the emotional classifier model is trained with words or phrases that have emotional labels assigned thereto, where the emotional labels identify respective emotions assigned to the words or phrases (e.g., happy, sad, angry, and neutral are example emotional labels). Thus, the emotional classifier model is configured to assign a label to the text that identifies an emotion that is to be assigned to the text. The computing system obtains a textual embedding of the text from the emotional classifier model, where the textual embedding includes semantic information about the words of the text, and where the textual embedding also encodes information pertaining to emotion in the text. In an example, the computing system obtains the textual embedding from a penultimate layer of the emotional classifier model.

The computing system generates a phoneme sequence based upon the words of the text, generates a phoneme embedding based upon the phoneme sequence, and generates a phoneme encoding based upon the phoneme sequence. Further, the computing system identifies a cluster from amongst several previously identified clusters, where the textual embedding is associated with the cluster. In an example, the computing system provides the phoneme embedding as input to an encoder of a TTS model. The encoder outputs a phoneme encoding based upon the input, where the phoneme encoding reflects acoustic or phonetic information about the text.

The computing system provides the textual embedding, the phoneme encoding, and an identity of the cluster as input to the TTS model. In an example, the computing system provides the textual embedding, the phoneme encoding, and the identity of the cluster as input to a decoder of the TTS model. For instance, the computing system concatenates the textual embedding and the phoneme encoding to generate a concatenation and provides the concatenation as input to the TTS model, where the input further includes an embedding that represents the cluster. The TTS model outputs a spectrogram (e.g., a Mel spectrogram) based upon the textual embedding, the phoneme encoding, and the identity of embedding that represents the cluster, where the spectrogram includes features that reflect an emotion underlying the text. In an example where the TTS model includes the encoder, the decoder outputs the spectrogram based upon the textual embedding and the phoneme encoding (as well as the vector that represents the cluster). The computing system provides the spectrogram to an audio converter which converts the spectrogram into audio data (e.g., a waveform). The computing system provides the audio data to a speaker and the speaker outputs speech (using the audio data) that includes the words in the text, where the speech expresses the emotion. Prosody features of the speech correspond to the emotion associated with the text (due to the textual embedding described above). Following the example given above, the speech output by the speaker includes the words "I am sorry for your loss" and is styled in a manner that reflects a "sad" emotion.

The above-described technologies present various advantages over conventional TTS computing systems. First, the above-described technologies do not require data that is labeled with emotional labels in order to train a TTS model. This reduces storage requirements and simplifies the training process of the TTS model. Additionally, the above-described technologies reduce time and computational costs associated with labeling. Second, at run-time, the above-described technologies do not require an emotional label to be provided along with text that is to be synthesized into speech, and thus the above-described technologies offer improved user experience relative to conventional TTS technologies.

Furthermore, this results in computational advantages, as the technologies described above do not need to process an emotional label at run-time in order to synthesize the speech. Third, the TTS technologies described herein can output speech having different "levels" of an emotion, as described above.

With reference to FIG. 1, an exemplary computing environment 100 that facilitates expressive TTS is illustrated. The computing environment 100 includes a computing system 102, where the computing system 102 can be or include a server computing device or devices, a cloud-based computing device or devices, a personal computing device (such as a desktop computing device, a laptop computing device, a smartphone, a gaming console, a virtual reality device, an augmented reality device, a wearable computing device (such as, but not limited to, a smart watch)), etc.

The computing system 102 includes a processor 104 and memory 106. The computing system 102 may also include a data store 108. The memory 106 has a TTS application 110 loaded therein. As will be described in greater detail below, the TTS application 110, when executed by the processor 104, is configured to (1) obtain computer-readable text 112 from an (electronic) text source 114; (2) facilitate generation of audio data 116 (e.g., a waveform) based upon the computer-readable text 112; and (3) cause speech 118 to be played over a speaker 120 based upon the audio data 116, where the speech 118 reflects an emotion that is associated with the text 112.

According to embodiments, the text source 114 is the computing system 102; that is, the computing system 102 stores the text 112 in the memory 106 and/or the data store 108. According to other embodiments, the text source 114 is a server computing device that is under control of an entity different from an entity controlling the computing system 102, and the computing system 102 obtains the text 112 from the server computing device by way of a network. According to further embodiments, the text source 114 is a computing device operated by a user and the computing system 102 obtains the text 112 from the computing device by way of a network.

According to embodiments, the text 112 is included in an electronic book that is to be played to a user. According to other embodiments, the text 112 is generated by a chat bot that is communicating with a user, such as a customer service chat bot. According to some embodiments, the text 112 is included in a website, such as a news website or a customer service website of an entity. According to further embodiments, a first computing device operated by a first user receives the text 112 as input from the first user and the speaker 120 that plays the speech 118 is included in a second computing device operated by a second user.

According to embodiments, the speaker 120 is included in the computing system 102. According to other embodiments, the speaker 120 is included in a computing device operated by a user or a computing device that is in proximity to the user.

The TTS application 110 includes a (computer-implemented) TTS model 122. As will be explained in greater detail below, the TTS model 122 is configured to facilitate generation of the speech 118 based upon the text 112, where the speech 118 reflects an emotion associated with the text 112. The TTS model 122 may be trained, at least partially, based upon data that does not include labels that identify emotions to be assigned to text and/or audio that accompanies the text in the training data. Furthermore, the TTS model 122 does not require an emotional label to be previously assigned to the text 112, such that at run-time only the text can be provided to the TTS application 110 (instead of the text and an emotional label). According to embodiments, the TTS model 122 is an end-to-end generative TTS model. According to embodiments, the TTS model 122 is or includes transformers or neural networks, such as recurrent neural networks (RNNs), Long Short Term Memory (LSTM) RNNs, and/or convolutional neural networks (CNNs). According to embodiments, the TTS model 122 is a FastSpeech2 model.

The TTS application 110 further includes a computer-implemented emotional classifier model 124. The emotional classifier model 124 is trained to receive a text sample (e.g., a word, a phrase, a sentence, a paragraph) and assign an emotional classification to the text sample; that is, the emotional classifier model 124 is trained with text samples that have emotional labels assigned thereto, where the emotional labels identify respective emotions assigned to the text samples (e.g., happy, sad, angry, neutral, etc.). As such, the emotional classifier model 124 is configured to assign an emotional label (e.g., happy, sad, angry, etc.) to text based upon the text.

According to embodiments, the emotional classifier model 124 is pre-trained. In an example, the text 112 is a sample that includes one or two sentences. As part of assigning the emotional label to the text, the emotional classifier model 124 generates a textual embedding (e.g., a vector representation) of the text, where the textual embedding includes semantic information about content of the text. As will be described in greater detail below, the TTS application 110 utilizes the textual embedding (as opposed to the classification) of the text 112 to generate the speech 118 that reflects an emotion associated with the text 112. According to embodiments, the emotional classifier model 124 includes a plurality of layers, where a last layer of the emotional classifier model 124 outputs a classification of text and where a penultimate layer of the emotional classifier model 124 outputs the textual embedding of the text. According to embodiments, the emotional classifier model 124 comprises a transformer model, an RNN-based model, or a LSTM RNN-based model. According to embodiments, the emotional classifier model 124 is a Bidirectional Encode Representations from Transformers (BERT) model, such as a robustly optimized BERT model (RoBERTa).

In an example training process of the TTS model 122, the computing system 102 (or another computing system) is provided with text-waveform pairs 126 that are stored in the data store 108. According to embodiments, the text-waveform pairs 126 do not include emotional labels, that is, a text-waveform pair in the text-waveform pairs 126 includes text and a waveform corresponding to the text, but not a label that is indicative of an emotion underlying the text or the corresponding waveform. The computing system 102 inputs text of each of the text-waveform pairs 126 into the emotional classifier model 124 and the emotional classifier model 124 outputs textual embeddings of the text of each of the text-waveform pairs 126. As will be described in greater detail herein, the textual embeddings are additionally clustered into a predefined number of clusters (with each embedding being included in a single cluster). The computing system 102 trains the TTS model 122 based upon the text-waveform pairs 126, the textual embeddings, and the clusters of textual embeddings. It is contemplated that the waveforms include speech expressed in different domains (e.g., a narrator of an audiobook narrating an audiobook, a newscaster reading the news, etc.).

As will be described in greater detail below, the TTS application 110, via the TTS model 122 and the emotional classifier model 124, generates a spectrogram 130 based upon the text 112, where the spectrogram 130 includes features that reflect an emotion associated with the text 112. In an example, the spectrogram 130 is a Mel spectrogram. According to embodiments, the spectrogram 130 is retained in the data store 108. According to other embodiments, the spectrogram 130 is generated on demand and retained in the memory 106.

The TTS application 110 may further include an audio converter 132. In another example, the audio converter 132 is included in a separate application that executes on a separate computing device. The audio converter 132 is configured to convert the spectrogram 130 into audio data 116 (e.g., a waveform) such that the speech 118 can be output by the speaker 120 based upon the audio data 116.

Figure 2:
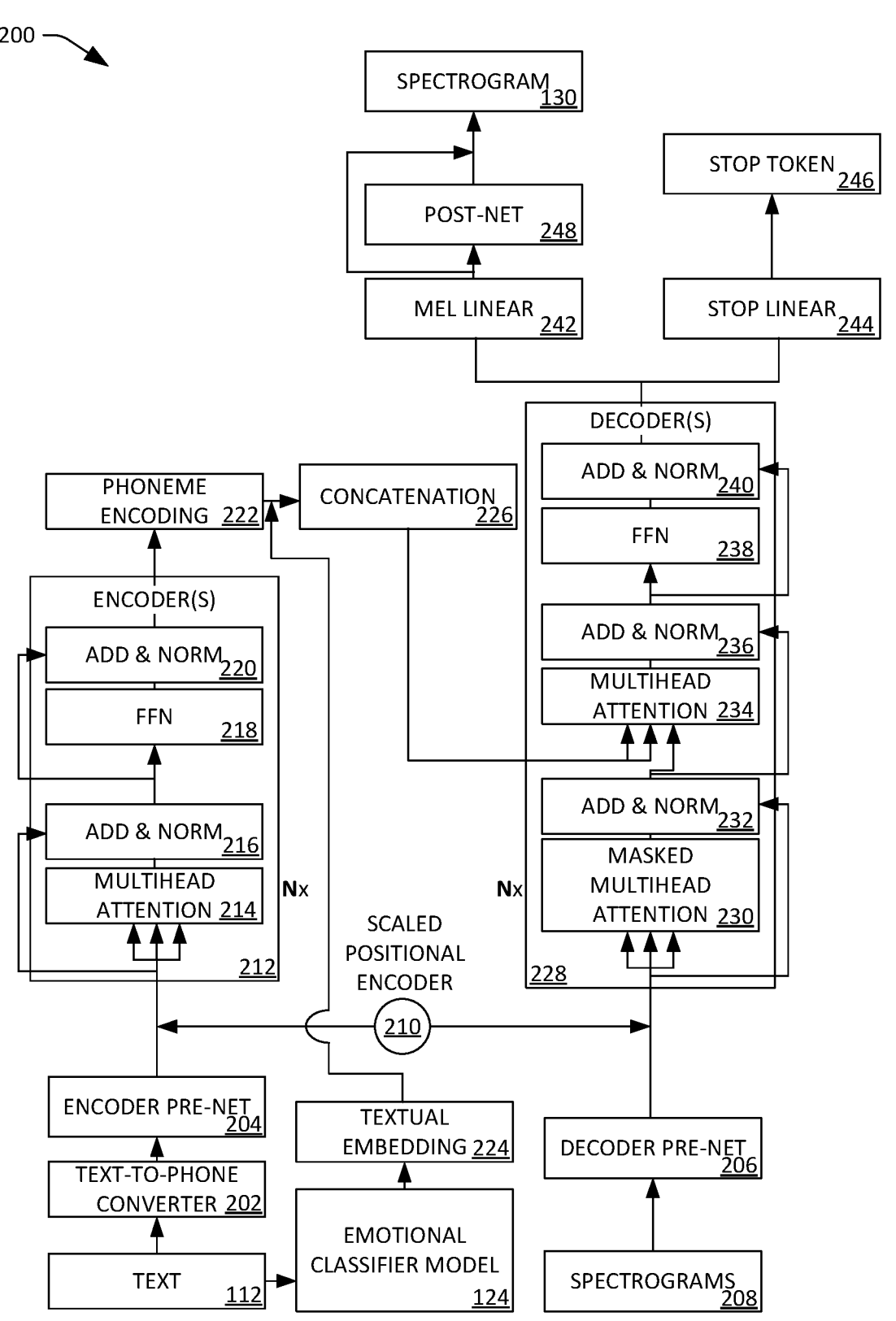
FIG. 2 is a functional block diagram of an exemplary TTS model and an emotional classifier model.

Turning now to FIG. 2, a functional block diagram 200 of the TTS model 122 and the emotional classifier model 124 is illustrated. The TTS model 122 includes a text-to-phone converter 202 that converts the text 112 into a phoneme sequence. The TTS model 122 further includes an encoder pre-net 204 that generates a phoneme embedding based upon the phoneme sequence. The TTS model 122 includes a decoder pre-net 206 that is configured to project spectrograms 208 (e.g., Mel spectrograms) into the same subspace as phoneme embeddings (generated by the encoder pre-net 204) so that similarity of phoneme-Mel frame pairs can be measured. The TTS model 122 includes a scaled positional encoder 210 that is configured to inject positional information into the output of the encoder pre-net 204 and the decoder pre-net 206. According to embodiments, the positional information is injected by triangle positional embeddings.

The TTS model 122 includes N encoder(s) 212, where N is a positive integer and where each of the encoder(s) 212 are connected to one another. Each encoder in the encoder(s) 212 includes a first multihead attention 214 that is connected to a first add & norm layer 216. The first multihead attention 214 takes output of the encoder pre-net 204 or output of a previous encoder in the encoder(s) 212 as input. Each encoder in the encoder(s) 212 also includes a first feed forward network (FFN) 218 that is connected to the first add & norm layer 216. Each encoder in the encoder(s) 212 further includes a second add & norm layer 220 that is connected to the first FFN 218 and the first add & norm layer 216. Ultimately, the encoder(s) 212 generate a phoneme encoding 222 based upon the phoneme embedding (which is generated from the phoneme sequence).

As depicted in FIG. 2, the emotional classifier model 124 takes the text 112 as input and generates a textual embedding 224 based upon the input. The textual embedding 224 captures semantic information about the text 112. The TTS model 122 concatenates the textual embedding 224 and the phoneme encoding 222 to generate a concatenation 226 of the textual embedding 224 and the phoneme encoding 222. According to embodiments, a variance adapter (not shown in FIG. 2) adds variance information to the phoneme encoding 222 (e.g., duration, pitch, and energy).

The TTS model 122 further includes N decoder(s) 228, where N is a positive integer. Each decoder in the decoder(s) 228 includes a masked multihead attention 230 that takes output of the decoder pre-net 206 or output of a previous decoder in the decoder(s) 228 as input. The masked multihead attention 230 is connected to a third add & norm layer 232 in each decoder in the decoder(s) 228. The third add & norm layer 232 is connected to a second multihead attention 234 in each decoder in the decoder(s) 228. The second multihead attention 234 takes, as input, the concatenation

226 as well as data output by the third add & norm layer 232. The second multihead attention 234 is connected to a fourth add & norm layer 236 in each decoder in the decoder(s) 228. The fourth add and norm layer 236 is connected to the third add & norm layer 232 and a second FFN 238 in each decoder in the decoder(s) 228. The second FFN 238 is connected to a fifth add & norm layer 240 in each decoder in the decoder(s) 228. The fifth add & norm layer 240 is also connected to the fourth add & norm layer 236 in each decoder in the decoder(s) 228.

The TTS model 122 includes a Mel linear projection 242 that generates a predicted spectrogram and a stop linear projection 244 that represents a predicted stop token 246. The predicted spectrogram is input to a post-net 248 with residual connections to generate the spectrogram 130 (e.g., a Mel spectrogram).

In addition, as referenced above, the decoder(s) 228 can generate the spectrogram 130 based upon an identity of a cluster to which a textual embedding of a text sample is assigned. More specifically, the textual embedding 224 is compared with a plurality of predefined clusters (e.g., 16 predefined clusters), and is assigned to a cluster from amongst the plurality of predefined clusters. A vector that represents the cluster to which the textual embedding 224 is assigned (where the vector can be referred to as a cluster head) is provided to the decoder(s) 228, and the decoder(s) 228 generate the spectrogram 130 based upon the vector that represents the cluster.

Referring generally now to FIGS. 1 and 2, example operation of the computing environment 100 is now set forth. Although it is understood that there may be N encoder(s) 212 and N decoder(s) 228 in the TTS model 122, the N encoder(s) 212 will be referred to below as "the encoder 212" and the N decoder(s) 228 will be referred to below as "the decoder 228" for ease of explanation. The TTS application 110 obtains the text 112 from the text source 114. In an example, the text 112 includes the sentence: "We cannot currently offer you this loan, we are sorry for informing you so late," and as such, when such text is spoken, the speech should be emitted with a "sad" emotion. The TTS application 110 provides the text 112 as input to the emotional classifier model 124. The emotional classifier model 124 outputs the textual embedding 224 based upon the text 112, where the textual embedding 224 captures semantic information about the text 112. The TTS application 110 obtains the textual embedding 224 from the emotional classifier model 124. Further, a cluster is identified based upon the textual embedding 224. For instance, there may be several (e.g., 16) clusters, and a centroid is computed for each cluster. The cluster with the centroid being closest to the textual embedding 224 can be identified.

The TTS application 110 generates a phoneme sequence by way of the text-to-phone converter 202 based upon the text 112. In an example, a phoneme in the phoneme sequence is a sound or a group of different sounds perceived to have a same function by speakers of a particular language. The TTS application 110 generates, by way of the encoder pre-net 204, a phoneme embedding based upon the phoneme sequence. The TTS application 110 generates, by way of the encoder 212 of the TTS model 122, the phoneme encoding 222 based upon the phoneme embedding.

The TTS application 110 provides the textual embedding 224, the phoneme encoding 222, and an identity of the cluster as input to the decoder 228 of the TTS model 122. In an example, the TTS application 110 concatenates the textual embedding 224 and the phoneme encoding 222 to generate the concatenation 226 and provides the concatenation 226 and the identity of the cluster as input to the decoder 228. The decoder 228 of the TTS model 122 outputs, based upon the textual embedding 224, the phoneme encoding 222, and the centroid of the cluster, the spectrogram 130, where the spectrogram 130 includes features that are indicative of the words in the computer-readable text 112 and that are reflective of an emotion that is associated with the text 112; that is, the spectrogram 130 is indicative of an emotion that is to be expressed when the words of the text 112 are audibly output. The audio converter 132 converts the spectrogram 130 into the audio data 116 (e.g., a waveform). The TTS application 110 provides the audio data 116 to the speaker 120, where the speaker 120 outputs the speech 118 based upon the audio data 116 and where prosody features of the speech 118 reflect an emotion associated with the text 112 (due to the textual embedding 224 generated by the emotional classifier model 124). According to embodiments, the spectrogram 130 is converted into the audio data 116 and provided (e.g., transmitted) to the speaker 120 responsive to the TTS application 110 receiving an indication from a computing device. In acoustic terms, the prosody features of the speech 118 that reflect the emotion include fundamental frequency (as measured in hertz), duration (as measured in milliseconds or seconds), intensity (as measured in decibels) and/or spectral characteristics (e.g., distribution of energy at different parts of the audible frequency range). In auditory terms, the prosody features of the speech 118 that reflect the emotion include pitch of the speech 118, length of sounds in the speech 118, loudness of the speech 118, and/or timbre of the speech 118. Following the example given above, the speech 118 includes the words "We cannot currently offer you this loan, we are sorry for informing you so late" and is styled in a "sad" tone.

According to embodiments, the TTS application 110 receives an identifier for a human speaker. The identifier for the human speaker may relate to vocal characteristics such as timbre. The TTS application 110 provides the identifier for the human speaker as additional input to the TTS model 122 (e.g., as input to the decoder 228 of the TTS model 122). The speech 118 played over the speaker 120 can be styled in a voice of the human speaker based upon the identifier for the human speaker being input to the TTS model 122.

Figure 3:
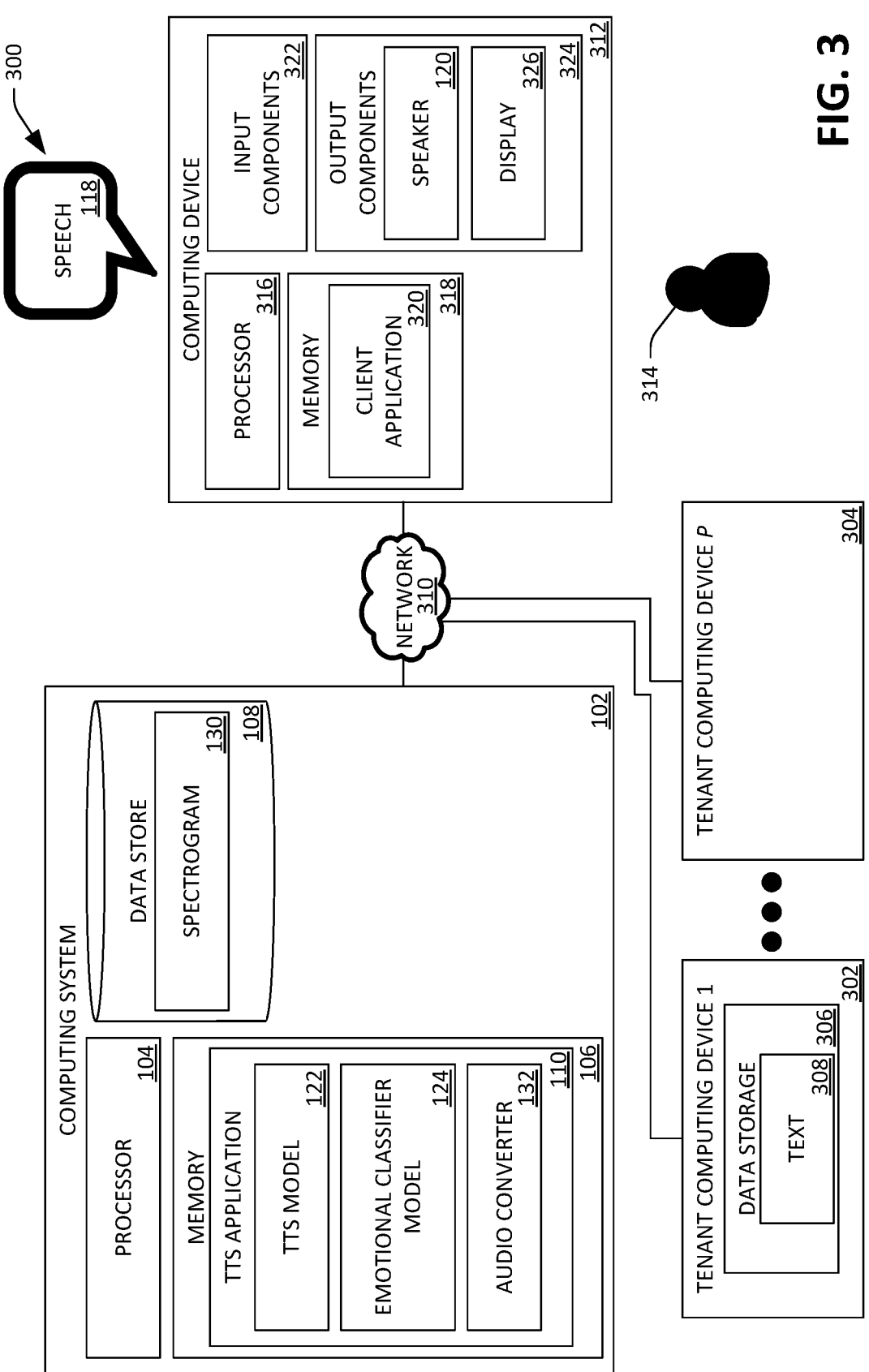
FIG. 3 is a functional block diagram of an exemplary computing environment that provides expressive TTS as a service.

Referring now to FIG. 3, an exemplary computing environment 300 that provides expressive TTS as a service is illustrated. The computing environment 300 includes the computing system 102 and its various components described above (e.g., TTS model 122, the emotional classifier model 124, etc.). The computing environment 300 further includes a first tenant computing device 302 under control of a first entity and a Pth tenant computing device 304 under control of a Pth entity, where P is a positive integer greater than one (collectively referred to herein as "the plurality of tenant computing devices 302-304"). The computing system 102 provides TTS as a service to the first entity and the Pth entity. The plurality of tenant computing device 302-304 may include server computing devices, computing devices operated by users, and/or cloud-based computing platforms. Further, the tenant computing devices 302-304 may be virtual machines executing in a cloud computing environment (rather than discrete, separate computing devices). The first tenant computing device 302 includes or has access to data storage 306 (e.g., memory, a data store, etc.) that stores text 308. In an example, the text 308 is text from a website. The Pth tenant computing device 304 also includes or has access to data storage that stores second text (not depicted in FIG. 3). In another example, the text 308 is generated by a chatbot that is provided by the first entity via the first tenant computing device 302. The plurality of tenant computing device 302-304 are in communication with the computing system 102 by way of a network 310 (e.g., the Internet).

The computing environment 300 further includes a computing device 312 that is operated by a user 314. The computing device 312 may be in communication with the computing system 102 by way of the network 310. The computing device 312 may also be in communication with one or more of the tenant computing devices 302-304 by way of the network 310. The computing device 312 includes a processor 316 and memory 318, where the memory 318 has a client application 320 loaded therein. The client application 320, when executed by the processor 316, may initiate synthesis of the speech 118 from the text 308. In an example, the client application 320 is a web browser that displays a webpage of the first entity, such as a customer service website. In another example, the client application 320 is an audiobook application.

The computing device 312 includes input components 322 that enable the user 314 to set forth input to the computing device 312. The input components 322 may include a mouse, a keyboard, a trackpad, a scroll wheel, a touchscreen, a camera, a video camera, a microphone, and/or a controller. The computing device 312 includes output components 324 that output information to the user 314. The output components 324 include the speaker 120. The output components 324 may also include a display 326 that presents graphical features thereon. The graphical features may include a graphical user interface (GUI) of the client application 320. In an example, the client application 320 presents a webpage on the display 326.

The computing environment 300 operates in a manner similar to the computing environment 100 described above. It is contemplated that the TTS application 110 receives an indication that the speech 118 is to be synthesized from the text 308. In one example, the indication is received by the TTS application 110 from the client application 320 when the client application 320 is loaded on the computing device 312. In another example, the indication is received by the TTS application 110 from the client application 320 when the user 314 selects an element displayed on the display 326, such as when the text 308 is displayed on the display 326. In a further example, the first tenant computing device 302 transmits the text 308 to the computing system 102 responsive to the first tenant computing device 302 receiving an indication that the user 314 has accessed a website (via the computing device 312) provided by the first entity, such as a customer service website. In yet another example involving a chatbot provided by the first tenant computing device 302, the client application 320 receives a message directed towards the chatbot as input from the user 314 and transmits the message to the first tenant computing device 302. The first tenant computing device 302 generates the text 308 as a response to the message and transmits the text 308 to the TTS application 110.

The TTS application 110 performs the above-described processes on the text 308 to cause the speech 118 to be played over the speaker 120, where the speech 118 includes the words of the text 308 and where prosody features of the speech 118 reflect an emotion that is associated with the words in the text 308.

Figure 4:
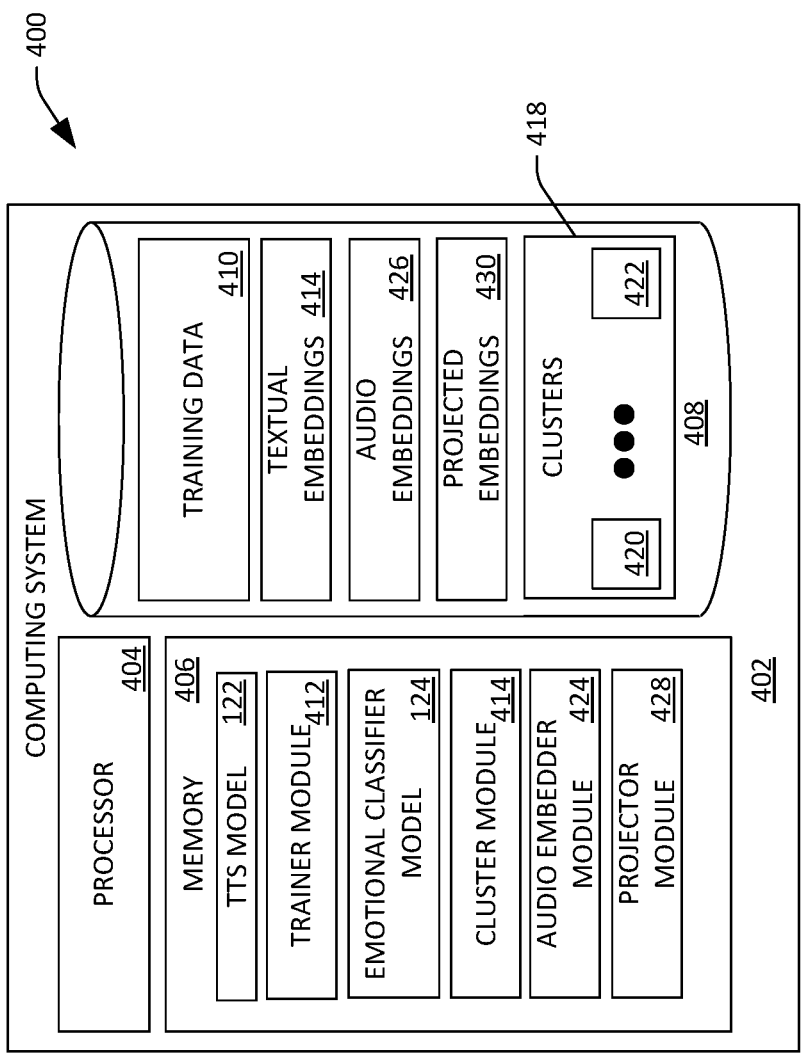
FIG. 4 is a functional block diagram of an exemplary computing system that is configured to train a TTS model.

Turning now to FIG. 4, an exemplary computing environment 400 for training the TTS model 122 is provided. The computing environment 400 includes a computing system 402 having a processor 404, memory 406, and a data store 408. The memory 406 includes the TTS model 112, which is to be trained.

The data store 408 includes training data 410 that is used in connection with training the TTS model 122. In an example, the training data 410 includes text samples and audio samples that respectively correspond to the text samples, where both the text samples and the audio samples are unlabeled. Thus, in an example, the TTS model 122 is trained by way of unsupervised learning technologies. Further, each text sample has an audio sample that respectively corresponds thereto. Thus, in an example, the training data 410 includes the text sample "I won the lottery", and the training data 410 further includes an audio file that includes a spoken utterance "I won the lottery" that corresponds to the text sample. The training data 410 can include thousands to millions of text sample-audio sample pairs.

The memory 406 further includes a trainer model 412 that is configured to train the TTS model 122 based upon the training data 410 in the data store 408. With more particularity, the memory 406 further includes the emotional classifier model 124 (which operates as described above) that generates textual embeddings 414 of the text samples in the training data 110. As referenced above, the emotional classifier model 124 receives a text sample and generates an embedding of the text sample, where the embedding is an N-dimensional vector. Therefore, when there are M text samples in the training data 410, the emotional classifier model 124 generates M N-dimensional vectors. The memory 406 further includes a cluster module 416 that is configured to receive the textual embeddings 414 generated by the emotional classifier model 124 and cluster such textual embeddings 414 into clusters 418, where the clusters 418 includes a predefined number of clusters 420-422. The predefined number of clusters may be 16 clusters. In other examples, the predefined number of clusters is 4, 8, 32, 64, or 128 clusters. The cluster module 414 can employ any suitable technique when clustering the textual embeddings 414; in an example, the cluster module 414 uses k-means clustering to cluster the textual embeddings 414.

The memory 406 also includes an audio embedder module 424 that is configured to generate audio embeddings 426 for the audio samples in the training data 410, where the audio embeddings are in audio embedding space. Therefore, for instance, the audio embedder model, for the M audio samples in the training data 410, generates M Q-dimensional vectors, where a Q-dimensional vector (audio embedding) is representative of features of an audio sample in the training data 410, and further where the Q-dimensional vector encodes information indicative of emotion associated with the audio sample. In an example, the audio embedder module 424 is or includes a Global Style Token (GST). In such an example, the audio samples are converted into Mel spectrograms, and each Mel spectrogram is provided as input to the GST. The GST then outputs a Q-dimensional vector for each Mel spectrogram. Experimentally, clusters of audio embeddings were found to encode different emotional "levels"; for instance, in an experiment, a set of audio samples included labels assigned thereto, where each audio sample was assigned one label (by a human labeler), and the label was one of "happy", "sad", "angry", and "neutral". The set of audio samples was provided to the audio embedder module 424, which generated Q-dimensional vectors for the audio samples in the set. The cluster module 414 clustered the Q-dimensional vectors into four clusters, and such clusters were highly correlated to the labels referenced above. This observation indicated that the TTS model 122 can be trained in an unsupervised manner, as the audio embeddings 426 encode emotion of the audio samples and the textual embeddings 414 encode emotion in text samples that correspond to the audio samples.

The memory 406 further includes a projector module 428 that is configured to project text embeddings (and, as will be described below, cluster heads) from textual embedding space to audio embedding space, thereby transforming the textual embeddings 414 into projected embeddings 430. In an example, the projector module 428 includes a nonlinear two-layer feed forward network and a Gaussian Error Linear Unit (GELU) activation function. Therefore, a text sample and corresponding audio sample in the training data 410 are converted to a projected embedding and an audio embedding, respectively, both in the audio embedding space. The TTS model 122, as will be described below, is trained based upon the audio embeddings 426, the projected embeddings 430, and the clusters 420-422.

Operation of the computing system 400 is now set forth. The emotional classifier model 124 receives the text samples from the training data 410 and outputs the textual embeddings 414 based upon the text samples. The cluster module 414 receives the textual embeddings 414 and generates the clusters 418 based upon the textual embeddings 414. The cluster module 414 can additionally generate vectors that are respectively representative of the clusters 420-422, where these vectors can be referred to as cluster heads. For instance, the cluster module 414 generates a vector for the cluster 420, where the vector represents a centroid of the cluster 420. In another example, the cluster module 414 generates a vector for the cluster 420, where the vector includes median values of textual embeddings included in the cluster 420. In still yet another example, the cluster module 414 generates a vector for the cluster 420, where the vector includes mean values of textual embeddings included in the cluster. Therefore, when there are sixteen clusters, the cluster module 414 generates sixteen cluster heads.

Mel spectrograms are generated for the audio samples included in the training data, and the audio embedder module 424 generates the audio embeddings 426 based upon the Mel spectrograms. The projector module 428 projects the textual embeddings 414 and the cluster heads for the clusters into audio embedding space, thereby generating the projected embeddings 430 for the textual embeddings 414 and further generating projected embeddings for the cluster heads.

The TTS model 122 can be trained jointly with the GST, such that the GST is trained. Thereafter, in an exemplary embodiment, with respect to a first threshold number of training iterations, the trainer module 412 trains the TTS model 122 such that L2 loss between projected embeddings and audio embeddings is minimized. For instance, the first threshold number may be 20,000. For other training iterations, an attention mechanism (not shown) is provided with the following: a projected embedding that corresponds to a text sample; projected embeddings for the cluster heads; and an audio embedding for an audio sample that corresponds to the text sample. The attention mechanism can identify any of: 1) the projected embedding that corresponds to the text sample; or 2) a projected embedding for one of the cluster heads. The trainer module 412 trains the TTS model 122 based upon the identified embedding. Using attention between the projected embeddings referenced above allows for selection of an appropriate text emotion when the emotion of the text sample and the emotion of the audio sample do not match (e.g., when the text sample is "I just won the lottery", which is to be read with a "happy" emotion, but the corresponding audio sample in the training data that includes the spoken utterance "I just won the lottery" is spoken with a "sad" emotion). Optionally, L2 loss can continue to be considered by the trainer module 412 when training the TTS model 122; however, influence of L2 loss can be reduced.

Figure 5:
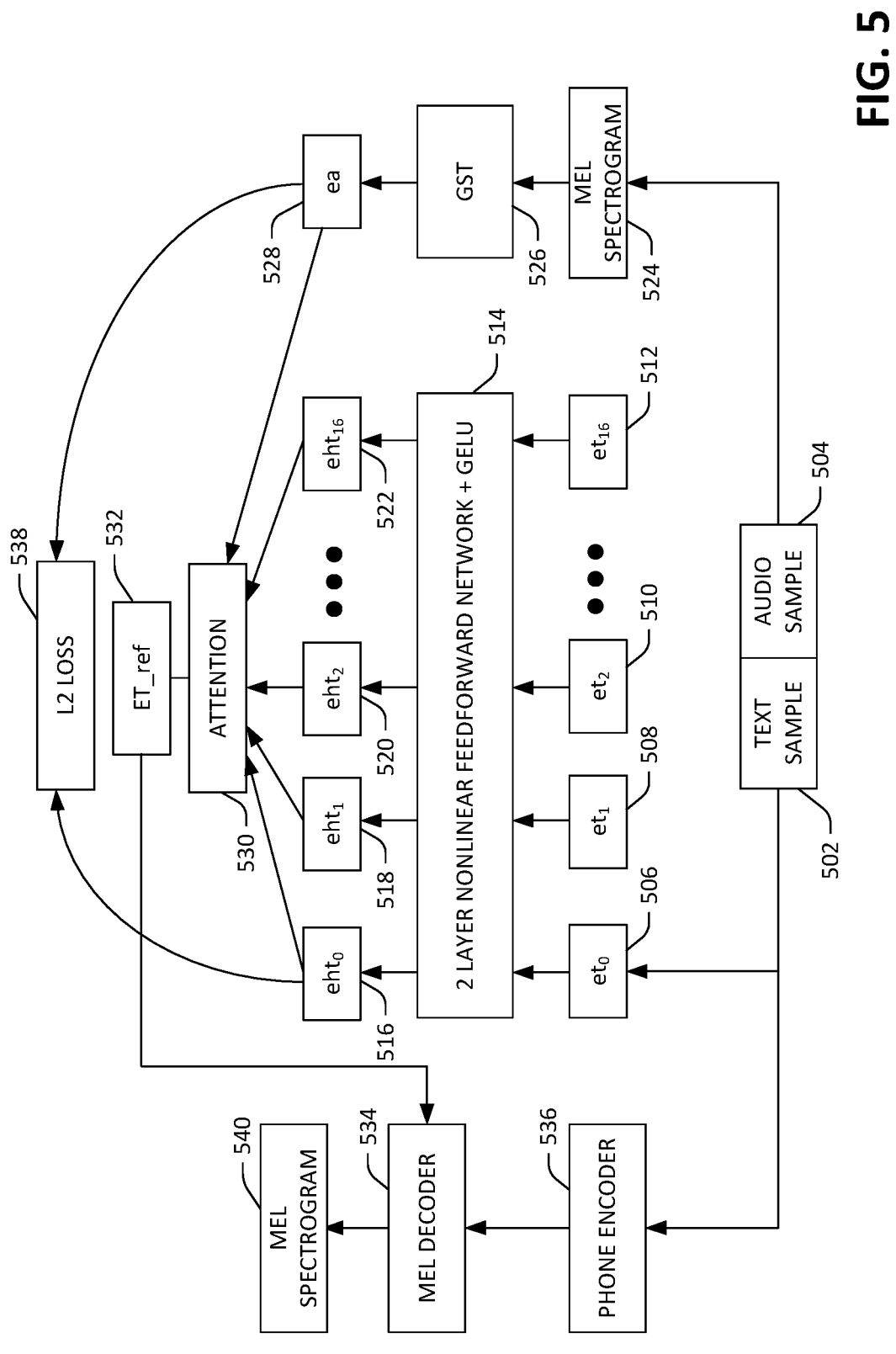
FIG. 5 is a diagram that illustrates training of an exemplary TTS model.

Referring now to FIG. 5, a functional block diagram of a computer-implemented system 500 for training a TTS model is illustrated. The TTS model is to be trained such that when the TTS model receives text, the TTS model can audibly output spoken words with an appropriate emotion for the text. In operation, training data includes a text sample 502 and a corresponding audio sample 504, wherein the text sample 502 includes a phrase and the audio sample 504 includes a person speaking the phrase in the text sample 502. As described above, a textual embedding 506 of the text sample 502 is generated, where the textual embedding 506 is in a textual embedding space. A 2-layer nonlinear feedforward network with a GELU activation function 514 in communication therewith receives the textual embedding 506 and textual embeddings 508-512 of sixteen cluster heads (where the textual embeddings 508-512 of the sixteen cluster heads are also in the textual embedding space). The 2-layer nonlinear feedforward network with the GELU activation function 514 projects the textual embeddings 506-512 into audio embedding space, such that projected audio embeddings 516-522 are formed, where the projected audio embedding 516 corresponds to the text sample 502 and the projected audio embeddings 518-522 correspond to the cluster heads.

A Mel spectrogram 524 is generated based upon the audio sample 504, and a GST 526 receives the Mel spectrogram 524. The GST 526 outputs an audio embedding 528 (in audio embedding space) based upon the Mel spectrogram 524.

An attention mechanism 530 receives the projected audio embeddings 516-522 and the audio embedding 528; a textual embedding 532 is identified based upon output of the attention mechanism 530. In effect, the attention mechanism 530 and the clusters are employed to overcome issues that arise when emotion of the text sample 502 and the audio sample 504 are misaligned with one another; the attention mechanism 530 is configured to align emotions across text sample/audio sample pairs in the training data 408. Put differently, the textual embedding 532 is used to cause emotion encoded in the textual embedding 506 to align with the emotion encoded in the audio embedding 528, particularly when there is a mismatch between emotion encoded in the textual embedding 506 and emotion encoded in the audio embedding 528.

A Mel decoder 534 is trained based upon the textual embedding 532 and the Mel spectrogram 524, where the training is undertaken to improve how the Mel decoder 534 processes information output by a phone encoder 536. In addition, as indicated previously, L2 loss 538 can be contemplated when training the Mel decoder 534, where weight corresponding to L2 loss 538 when training the Mel decoder 534 reduces as training iterations increase (e.g., L2 loss is assigned a first weight for a first number of training iterations and is assigned a second weight for a second, subsequent number of training iterations).

When the TTS model is employed to transform text to speech, the phone encoder 536 is provided with a textual embedding of a text sample, and the phone encoder 536 outputs data that is indicative of a sequence of phones. In addition, a cluster from amongst the clusters 506-512 is identified based upon the textual embedding. Output of the phone encoder 536 and a vector representation of the cluster are provided to the Mel decoder 534, which generates a Mel spectrogram 540. A waveform is generated based upon the Mel spectrogram 540, where the waveform encodes spoken utterances that correspond to the received text sample, and further wherein the spoken utterances have an appropriate emotion.

FIGS. 6 and 7 illustrate exemplary methodologies relating to computer-implemented expressive TTS. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Referring now solely to FIG. 6, an exemplary methodology 600 performed by a computing system that facilitates expressive TTS is illustrated. The methodology 600 begins at 602, and at 604, the computing system obtains computer-readable text that includes words. The words of the computer-readable text are associated with an emotion (e.g., happy, sad, etc.). At 606, the computing system provides the computer-readable text as input to an emotional classifier model. The emotional classifier model has been trained based upon text having emotional labels assigned thereto, where the emotional labels identify respective emotions assigned to content of the text. At 608, the computing system obtains a textual embedding of the computer-readable text extracted from the emotional classifier model, where the textual embedding represents semantics of the text. At 610, a cluster is identified from amongst a plurality of clusters based upon the textual embedding. At 611, the computing system generates a phoneme sequence based upon content of the computer-readable text. At 612, the computing system generates, by way of an encoder of a TTS model, a phoneme encoding based upon the phoneme sequence. At 614, the computing system generates a concatenation of the textual embedding and the phoneme encoding. At 616, the computing system provides the concatenation and the vector that represents the cluster as input to a decoder of the TTS model. The decoder of the TTS model generates an output that is indicative of the emotion that is to be expressed when spoken utterances corresponding to the text are audibly output, wherein the output is based at least in part upon the identified cluster. At 618, the computing system causes speech that includes the words to be played over a speaker based upon output of the decoder of the TTS model, where the speech expresses the emotion. In an example, prosody features of the speech correspond to the emotion associated with the words of the computer-readable text. The methodology 600 concludes at 620.

With reference to FIG. 7, an exemplary methodology 700 for training a TTS model is depicted. The methodology 700 starts at 702, and at 704 training data is received for training a TTS model, where the training data is unlabeled and includes text and corresponding audio samples.

At 706, the text samples of the training data are provided to a text embedding model. The text embedding model processes the text samples and generates text embeddings for the text samples. In some embodiments, the outputted text embeddings (or a subset of the outputted text embeddings) are projected to an audio embedding space.

At 708, the outputted text embeddings are clustered (e.g., via k-means clustering) into a predefined number of clusters of text embeddings. In some embodiments, cluster heads of the clusters are projected to audio embedding space. The clusters can be representative of different "levels" of emotion.

At 710, audio training data is provided to an audio embedding model (e.g., a global style token (GST) model), where the audio training data is unlabeled audio training data. The audio embedding model is configured to output audio embeddings of the audio training data, where the outputted audio embeddings are in the audio embedding space.

At 712, a projected text embedding for a text sample or one of the projected cluster heads is selected based upon the audio embedding in the training data that corresponds to the text sample. It should be appreciated that an attention mechanism may be used for selecting the projected text embedding or the projected cluster head from the audio embedding space based on the audio embedding.

At 714, an embedded text input is selected based upon output of the attention mechanism, where the selected embedded text input is a textual embedding of one of the sample text or the selected cluster head.

At 716 the TTS model is trained based upon the embedded text input. It should be appreciated that several training iterations may be performed when training the TTS model. The methodology 700 completes at 718.

Referring now to FIG. 8, a high-level illustration of an example computing device 800 that can be used in accordance with the systems and methodologies disclosed herein is illustrated. For instance, the computing device 800 may be used in a system that generates speech based upon computer-readable text, where the speech reflects an emotion underlying the computer-readable text. By way of another example, the computing device 800 can be used in a system that plays speech over a speaker based upon computer-readable text. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store computer-readable text that includes words, TTS models, emotional classifier models, spectrograms, audio data, text classifiers, text-waveform pairs, etc.

The computing device 800 additionally includes a data store 808 that is accessible by the processor 802 by way of the system bus 806. The data store 808 may include executable instructions, computer-readable text that includes words, TTS models, emotional classifier models, spectrograms, audio data, text classifiers, text-waveform pairs, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. Such computer-readable storage media can include random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
memory storing instructions that, when executed by the processor, cause the processor to perform acts comprising:
receiving training data for training a text to speech (TTS) model, wherein the training data includes text that comprises text samples, wherein the training data does not include emotional labels indicative of one or more emotions expressed in the text; and
training the TTS model based upon the training data, wherein training the TTS model comprises:
providing the text samples to a text embedding model, wherein the text embedding model outputs text embeddings for the text samples wherein the text embeddings comprise one or more emotions encoded in the text embeddings by the text embedding model;
clustering the text embeddings into several clusters of text embeddings, wherein the several clusters are representative of variations in emotion encoded in the textual embeddings; and
training the TTS model based upon the several clusters of text embeddings, wherein the TTS model, upon being trained, is configured to receive text input and output a spoken utterance that corresponds to the text input, wherein the TTS model is configured to output the spoken utterance with an emotion, and further wherein the emotion is based upon the text input and the training of the text to speech model.

2. The system of claim 1, wherein the text embeddings are clustered into the several clusters of text embeddings by way of k-means clustering.

3. The system of claim 1, wherein the training data is does not include labels that identify emotions, and further wherein training the TTS model is accomplished by way of unsupervised learning.

4. The system of claim 1, wherein the several clusters are 16 clusters.

5. The system of claim 1, the acts further comprising:
identifying cluster heads for the several clusters, where the cluster heads are centroids of the several clusters.

6. The system of claim 1, the acts further comprising:
subsequent to training the TTS model, receiving the text input;
providing the text input to the TTS model;
generating, by the TTS model, the spoken utterance based upon the text input; and
causing a speaker of a client computing device to audibly output the spoken utterance.

7. The system of claim 1, wherein the training data further comprises audio samples that correspond to the text samples, and wherein training the TTS model further comprises:
providing the audio samples to an audio embedding model, wherein the audio embedding model outputs audio embeddings, and further wherein training the TTS model is based upon the several clusters of text embeddings and the audio embeddings.

8. The system of claim 7, wherein the audio embedding model is a Global Style Token model.

9. The system of claim 7, wherein training the TTS model based upon the training data further comprises:
projecting a text embedding for a text sample in the training data into audio embedding space to form a projected embedding;
projecting embeddings of cluster heads for the clusters into the audio embedding space to form projected cluster head embeddings; and
selecting, by an attention mechanism, a projected cluster head embedding in the projected cluster head embeddings based upon an audio embedding in the audio embeddings that corresponds to the text sample, wherein the TTS model is trained based upon the selected projected cluster head embedding.

10. The system of claim 9, wherein training the TTS model further comprises:
identifying a cluster head embedding based upon the selected projected cluster head embedding, wherein the TTS model is trained based upon the identified cluster head embedding.

11. A method for training a text to speech model (TTS) that, the method comprising:
obtaining training data for training the TTS model, wherein the training data comprises text samples and audio samples, wherein the training data does not include emotional labels indicative of one or more emotions expressed in the text samples and the audio samples;
providing the text samples to a text embedding model, wherein the text embedding model outputs text embeddings for the text samples wherein the text embeddings comprise one or more emotions encoded in the text embeddings by the text embedding model;

clustering the text embeddings into several clusters of text embeddings, wherein the several clusters are representative of variations in emotion encoded in the textual embeddings; and training the TTS model based upon the several clusters of text embeddings, wherein the TTS model, upon being trained, is configured to receive text input and output a spoken utterance that corresponds to the text input, wherein the TTS model is configured to output the spoken utterance with an emotion, and further wherein the emotion is based upon the text input and the training of the text to speech model.

12. The method of claim 11, wherein training the TTS model comprises:

converting the audio samples into spectrograms; and generating audio embeddings for the audio samples based upon the spectrograms, wherein a Global Style Token is employed to generate the audio embeddings, and further wherein the TTS model is trained based upon the audio embeddings.

13. The method of claim 11, wherein training the TTS model comprises:

generating text embeddings for the text samples, wherein the text embeddings are vectors of uniform length that comprise one or more emotions encoded in the text embeddings;

clustering the text embeddings into a predefined number of clusters, where different clusters correspond to different emotions encoded in the textual embeddings;

projecting the text embeddings for the text samples into audio embedding space to form projected embeddings, wherein the TTS model is trained based upon the projected embeddings.

14. The method of claim 13, wherein training the TTS model comprises:

determining cluster heads for each of the predefined number of clusters; and projecting the cluster heads into the audio embedding space to form projected cluster head embeddings, wherein the TTS model is trained based upon the projected cluster head embeddings.

15. The method of claim 14, wherein a projection module that comprises a 2-layer nonlinear feed forward network projects the text embeddings and the cluster head embeddings into the audio embedding space.

16. The method of claim 14, further comprising:

using an attention mechanism to select a projected cluster head embedding from amongst the projected cluster head embeddings, wherein the attention mechanism selects the projected cluster head embedding based upon an audio embedding for an audio sample, and further wherein the TTS model is trained based upon the selected projected cluster head embedding.

17. The method of claim 16, wherein the TTS model is further trained based upon a difference between the audio embedding for the audio sample and a projected text embedding for a text sample that corresponds to the audio sample.

18. A non-transitory computer-readable storage medium comprising instructions that, when executed by a processor of a computing device, cause the processor to perform acts comprising:

receiving training data for training a text to speech (TTS) model, wherein the training data includes text that comprises text samples, wherein the training data does not include emotional labels indicative of one or more emotions expressed in the text; and training the TTS model based upon the training data, wherein training the TTS model comprises:

providing the text samples to a text embedding model, wherein the text embedding model outputs text embeddings for the text samples, wherein the text embeddings comprise one or more emotions encoded in the text embeddings by the text embedding model;

clustering the text embeddings into several clusters of text embeddings, wherein the several clusters are representative of variations in emotion encoded in the textual embeddings; and training the TTS model based upon the several clusters of text embeddings, wherein the TTS model, upon being trained, is configured to receive text input and output a spoken utterance that corresponds to the text input, wherein the TTS model is configured to output the spoken utterance with an emotion, and further wherein the emotion is based upon the text input and the training of the text to speech model.

19. The non-transitory computer-readable storage medium of claim 18, wherein the training data further comprises audio samples that correspond to the text samples, and wherein training the TTS model further comprises:

providing the audio samples to an audio embedding model, wherein the audio embedding model outputs audio embeddings, and wherein training the TTS model is based upon the several clusters of text embeddings and the audio embeddings.

20. The non-transitory computer-readable storage medium of claim 19, wherein the audio embedding model is a Global Style Token.

* * * * *